United States Patent
Shimomura

(10) Patent No.: US 11,131,828 B2
(45) Date of Patent: Sep. 28, 2021

(54) LENS APPARATUS AND IMAGE PICKUP APPARATUS

(71) Applicant: CANON KABUSHIKI KAISHA, Tokyo (JP)

(72) Inventor: Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 16/539,906

(22) Filed: Aug. 13, 2019

(65) Prior Publication Data
US 2020/0073078 A1    Mar. 5, 2020

(30) Foreign Application Priority Data

Aug. 31, 2018    (JP) .............................. JP2018-163194

(51) Int. Cl.
| | |
|---|---|
| *G02B 7/02* | (2021.01) |
| *G02B 7/28* | (2021.01) |
| *G02B 7/10* | (2021.01) |
| *G02B 7/09* | (2021.01) |

(52) U.S. Cl.
CPC .............. *G02B 7/028* (2013.01); *G02B 7/09* (2013.01); *G02B 7/102* (2013.01); *G02B 7/282* (2013.01)

(58) Field of Classification Search
CPC ........ G02B 7/028; G02B 7/282; G02B 7/102; G02B 7/09; G02B 7/08
USPC ........................................................ 359/820
See application file for complete search history.

(56) References Cited

U.S. PATENT DOCUMENTS 9,310,589 B2 *    4/2016   Wakazono ......... H04N 5/23296

FOREIGN PATENT DOCUMENTS

| JP | 2005-208255 A | 8/2005 |
| JP | 2016-170292 A | 9/2016 |

* cited by examiner

*Primary Examiner* — James C. Jones
(74) *Attorney, Agent, or Firm* — Canon U.S.A., Inc. IP Division

(57) ABSTRACT

An apparatus includes, in order from an object side to an image side, a focusing lens group, a zoom lens group, and a relay lens group. The relay lens group includes an extender group and a correction lens group. The apparatus includes a temperature detector, a storage storing information relating to a moving amount of the correction lens group, and a controller configured to control a position of the correction lens group. The storage stores first information relating to the moving amount for correction of focus movement due to change in a temperature and insertion of the extender group. The controller obtains the moving amount based on the temperature and the first information. A specific conditional expression is satisfied.

20 Claims, 9 Drawing Sheets

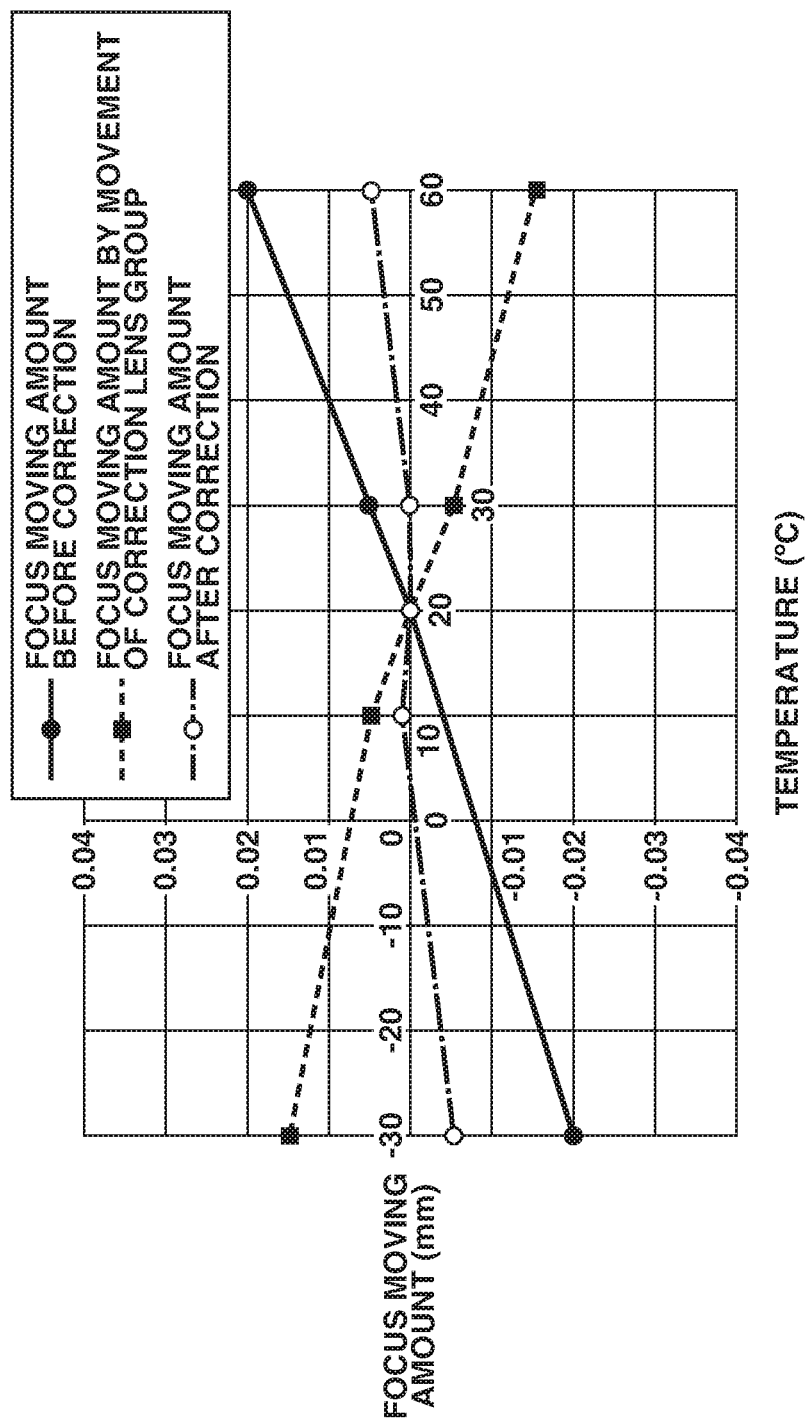

LENS APPARATUS AND IMAGE PICKUP APPARATUS

BACKGROUND OF THE INVENTION

Field of the Invention

The aspect of the embodiments relates to a lens apparatus and an image pickup apparatus.

Description of the Related Art

A lens apparatus in a video camera for broadcasting, for movie, or for consumers includes, in order from an object side to an image side, a focusing lens group for focusing, a zoom lens group that includes a variator and a compensator moved for zooming, and an image forming lens group for forming an image. Further, some of the lens apparatuses for broadcasting or for movie include an extender group that is selectively used (inserted) in the image forming lens group.

In the lens apparatus including the extender group, flange back adjustment to prevent focus deviation (defocusing) is performed while the extender group has not been inserted, whereas the flange back adjustment is not performed while the extender group is inserted. Accordingly, focus movement (focus deviation) may occur due to insertion of the extender group. Therefore, Japanese Patent Application Laid-Open No. 2016-170292 discusses a zoom lens that corrects or compensates for focus movement due to or caused by zooming operation, focusing operation, temperature change, aperture stop or diaphragm operation, insertion of the extender group, and attitude change of the lens apparatus. Further, Japanese Patent Application Laid-Open No. 2005-208255 discusses a lens apparatus that moves a lens in the extender group to correct or compensate for focus movement caused by insertion of the extender group.

In a 4K camera or an 8K camera, a depth of focus is shallow due to high definition of a pixel pitch of an image pickup element or imaging device. Therefore, focus movement caused by insertion of the extender group is conspicuous. Further, in such a camera, it is difficult to confine the focus movement caused by temperature change and insertion of the extender group to the range of the depth of focus.

Japanese Patent Application Laid-Open Nos. 2016-170292 and 2005-208255 do not specifically discuss a configuration of the lens apparatus to correct the focus movement caused by temperature change and insertion of the extender group.

SUMMARY OF THE INVENTION

According to an aspect of the embodiments, an apparatus includes, in order from an object side to an image side, a focusing lens group, a zoom lens group, and a relay lens group, and includes an aperture stop between the zoom lens group and the relay lens group or within the relay lens group. The relay lens group includes an extender group to be selectively inserted into an optical axis and a correction lens group to be moved along the optical axis for correction of focus movement. The apparatus includes a temperature detector configured to detect temperature in the lens apparatus, a storage that stores information relating to a moving amount of the correction lens group, and a controller configured to control a position of the correction lens group. The storage stores first information relating to the moving amount for correction of focus movement due to change in the temperature and the insertion of the extender group. The controller is configured to obtain the moving amount based on the temperature and the first information. A conditional expression $$0 \le |\beta/\alpha| \le 0.5$$

is satisfied where $\alpha$ is a maximum of absolute values of the moving amount at a wide-angle end in a temperature range of T<10° C. and T>30° C., and $\beta$ is a maximum of absolute values of the moving amount at the wide-angle end in a temperature range of 10° C.$\le$T$\le$30° C.

Further features of the disclosure will become apparent from the following description of exemplary embodiments with reference to the attached drawings.

BRIEF DESCRIPTION OF THE DRAWINGS

FIG. 9 is a diagram illustrating relationship of a focus moving amount caused by temperature change, a focus moving amount by movement of a correction lens group, and a focus moving amount after correction.

DESCRIPTION OF THE EMBODIMENTS

Figure 1:
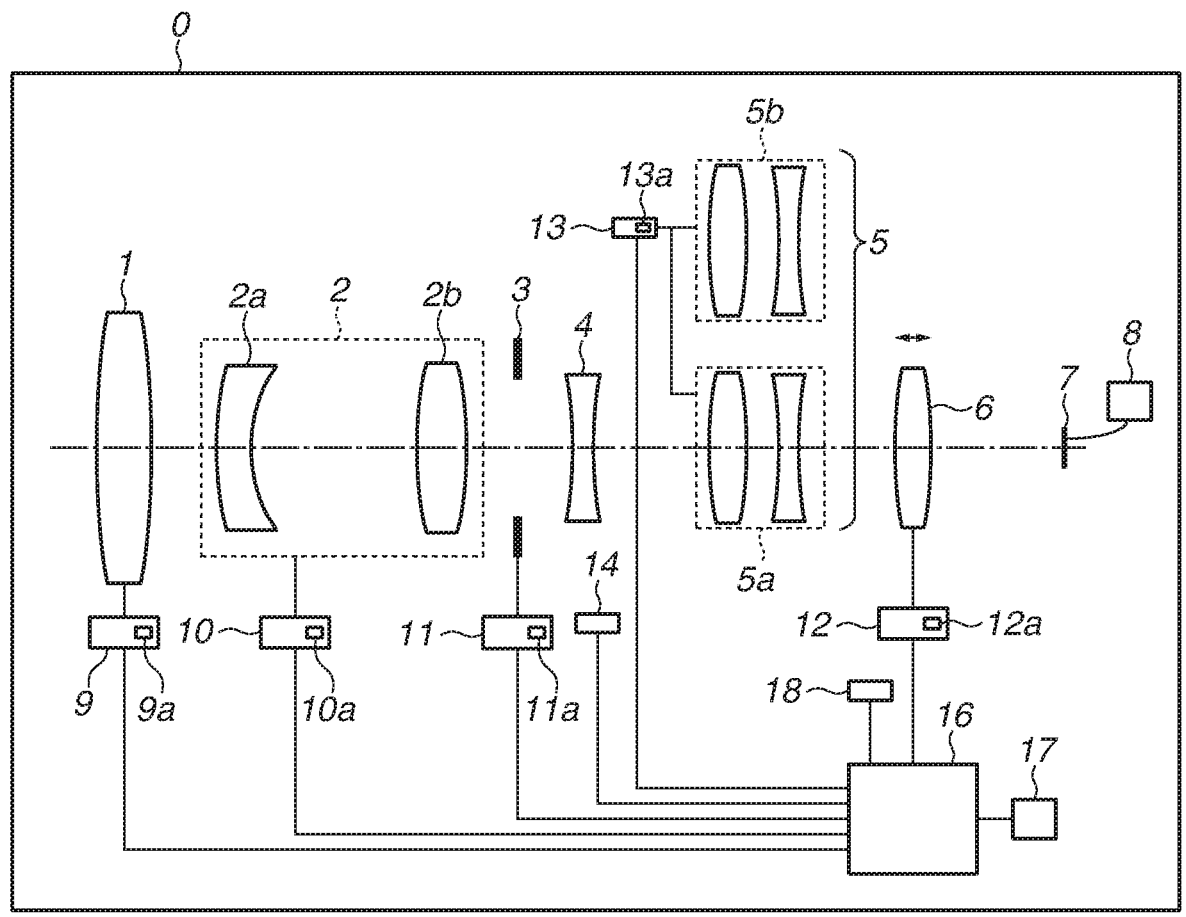
FIG. 1 is a diagram illustrating a configuration example of a lens apparatus according to a first exemplary embodiment.

Some exemplary embodiments of the disclosure are described below with reference to accompanying drawings. Through all the drawings for description of the exemplary embodiments, the same reference numerals are assigned to the same members and the like in principle (unless otherwise noted), and repeated description thereof is omitted.

FIG. 1 is a diagram illustrating a configuration example of a lens apparatus according to an exemplary embodiment (first exemplary embodiment described below). In FIG. 1, a focusing lens group 1 is at least partially moved along an optical axis for focusing. A zoom lens group 2 includes at least a lens group 2a (variator) and a lens group 2b (compensator). The lens group 2a is moved along the optical axis to zoom in/out. The lens group 2b is moved along the optical axis to zoom in/out, and correct (compensate) an image plane changed along with movement of the lens group 2a. An aperture stop 3 and a front relay lens group 4 are provided. A lens unit (lens module) 5 includes a standard group 5a that is used for a standard focal length range, and an extender group 5b that is used for a focal length range shifted toward telephoto side relative to the standard focal length range. One of the standard group 5a and the extender group 5b is selectively disposed on the optical axis. A state where the extender group is not disposed on the optical axis (state where standard group is disposed on optical axis in first exemplary embodiment) is also referred to as a standard state. A rear relay lens group 6 is a lens group that is moved along the optical axis to correct focus movement (focus deviation from focusing state), and is also referred to as a correction lens group. The components 4 to 6 are also collectively referred to as a relay lens group. Further, the components 1 to 6 configure the lens apparatus.

An image pickup element or imaging device 7 is disposed on the image plane of the lens apparatus (i.e. an image pickup element or imaging device 7 receives an image formed by the lens apparatus). An image-signal processing circuit 8 generates an image signal based on a signal from the imaging device 7. A driving unit 9 for the focusing lens group 1 may include a driving mechanism such as a helicoid screw and a cam, an actuator such as a motor, and a detection unit 9a that detects a control amount (e.g., position) of the focusing lens group 1. The driving unit 9 moves the focusing lens group 1 along the optical axis. A driving unit 10 for the zoom lens group 2 may include a driving mechanism such as a cam, an actuator such as a motor, and a detection unit 10a that detects a control amount (e.g., position) of the zoom lens group 2. The driving unit 10 moves the zoom lens group 2 along the optical axis. A driving unit 11 for the aperture stop 3 may include a driving mechanism such as a cam to move an aperture blade, an actuator such as a motor, and a detection unit 11a that detects a control mount (e.g., aperture diameter) of the aperture stop 3. The driving unit 11 changes an aperture of the aperture stop 3. A driving unit 12 for the correction lens group 6 may include a driving mechanism such as a helicoid screw, an actuator such as a motor, and a detection unit 12a that detects a control amount (e.g., position) of the correction lens group 6. The driving unit 12 moves the correction lens group 6 along the optical axis. A driving unit (switching unit) 13 for the lens unit 5 may include a driving mechanism including a turret, etc., an actuator such as a motor, and a detection unit 13a that detects a control mount (e.g., rotation angle of turret) of the lens unit 5. The driving unit 13 (switching unit) performs switching between the standard group 5a and the extender group 5b (insertion of one of standard group 5a and extender group 5b into optical axis). A temperature detection unit 14 detects temperature inside the lens apparatus. An attitude detection unit 18 detects an attitude of (optical axis of) the lens apparatus with respect to a horizontal plane. A processing unit 16 includes a processor such as a central processing unit (CPU), or a logic circuit. The processing unit 16 configures a control system (control unit) that controls driven units, together with the above-described driving units. A storage unit 17 stores information (also referred to as first information) relating to a moving amount of the correction lens group 6 for correcting focus movement due to or caused by change in the temperature inside the lens apparatus and insertion of the extender group 5b into the optical axis (hereinafter, also simply referred to as insertion). The insertion of the extender group 5b corresponds to switching (change) of a state from the standard state to a state where the extender group has been inserted into the optical axis. The above-described detection unit in the driving unit 13 also functions as an insertion detection unit that detects insertion of the extender group 5b into the optical axis. The insertion detection unit can detect whether the standard group 5a or the extender group 5b is disposed on the optical axis. In FIG. 1, an image pickup apparatus or imaging apparatus 0 includes the above-described components.

The processing unit 16 generates the moving amount of the correction lens group 6 based on the temperature detected by the temperature detection unit 14 and the above-described first information. The lens apparatus satisfies the following conditional expression (1):

$$0 \leq |\beta/\alpha| \leq 0.5, \quad (1)$$

where $\alpha$ is a maximum of absolute values of the moving amount at a wide-angle end in a temperature range of T<10° C. and T>30° C., and $\beta$ is a maximum of absolute values of the moving amount at the wide-angle end in a temperature range of 10° C.≤T≤30° C.

If the conditional expression (1) is satisfied, when the focus movement caused by temperature change and insertion of the extender group 5b is corrected, current consumption (power consumption) in a temperature range including the frequently used room temperature can be reduced as compared with the current consumption in a temperature range lower or higher than the room temperature. The focus movement caused by change in the temperature inside the lens apparatus and insertion of the extender group 5b in the temperature range including the room temperature (10° C.≤T≤30° C.) is smaller than the focus movement in the temperature range lower or higher than the subject temperature range. Accordingly, in the temperature range including the room temperature, even if the moving amount of the correction lens group 6 is small, the focus moving amount may fall within the range of the depth of focus. In contrast, in the temperature range lower or higher than the subject temperature range, the focus moving amount is larger than the focus moving amount in the temperature range including the room temperature. Therefore, if the moving amount of the correction lens group is not increased, the focus moving amount may be deviated from the range of the depth of focus. If the value of the conditional expression (1) exceeds an upper limit, the moving amount of the correction lens group 6 in the temperature range including the room temperature becomes excessively large, which excessively increases the power consumption for movement of the correction lens group 6. In one embodiment, the lens apparatus satisfies the following conditional expression (1a):

$$0 \leq |\beta/\alpha| \leq 0.25. \quad (1a)$$

In the lens apparatus, the correction lens group 6 may be a lens group on the image side of the lens unit 5. The zoom lens apparatus for broadcasting or for movie include a lens group (also referred to as flange-back adjustment group) for adjustment of flange back (correction or compensation of deviation of flange back) of the zoom lens apparatus, on the image side of the lens unit 5 including the extender group in some cases. In this case, the correction lens group 6 doubles the flange-back adjustment group while being located on the image side of the lens unit 5, which reduces the number of lens groups to be moved.

Further, the focus movement caused by the temperature change is not constantly corrected by the movement of the correction lens group 6 but is corrected only in a case where the state is switched from the standard state to the extender-group inserted state. The focus moving amount caused by the temperature change in the standard state is smaller than the focus moving amount caused by the temperature change in the extender-group inserted state. Therefore, it is sufficient for the lens apparatus to correct the focus movement caused by the temperature change only in the case where the state is switched from the standard state to the extender-group inserted state. Such a configuration makes it possible to reduce the power consumption for movement of the correction lens group 6 as compared with the case where the focus movement is constantly corrected.

Further, in the lens apparatus, the storage unit 17 may include information (also referred to as second information) relating to the moving amount of the correction lens group 6 for correction of the focus movement caused by the temperature change in the standard state. In such a case, the lens apparatus satisfies the following conditional expression (2):

$$0 \leq |y/x| \leq 1.0, \quad (2)$$

where x is a maximum of absolute values of the moving amount of the correction lens group 6 in the first information, and y is a maximum of absolute values of the moving amount of the correction lens group 6 in the second information.

When the value of the conditional expression (2) exceeds an upper limit, the focus moving amount may be deviated from the range of the depth of focus because of the small moving amount of the correction lens group 6 for correction of the focus movement caused by the temperature change and insertion of the extender group. In one embodiment, the lens apparatus satisfies the following conditional expression (2a):

$$0 \leq |y/x| \leq 0.5. \quad (2a)$$

Further, the lens apparatus satisfies the following conditional expression (3):

$$500 < L/\alpha < 100000, \quad (3)$$

where L is a distance between a lens surface on the most object side (nearest to an object) and a lens surface on the most image side (nearest to an image) of the lens apparatus.

The conditional expression (3) specifies the maximum of the moving amount of the correction lens group 6 in the high-temperature state and the low-temperature state. If the value of the conditional expression (3) becomes equal to or higher than the upper limit, the focus moving amount may be deviated from the range of the depth of focus because of the small moving amount of the correction lens group 6 for correction of the focus movement caused by the temperature change and insertion of the extender group in the high-temperature state and the low-temperature state. Further, if the value of the conditional expression (3) becomes equal to or lower than the lower limit, the driving mechanism for the correction lens group 6 is increased in size because of the large moving amount of the correction lens group 6 in the high-temperature state and the low-temperature state. In one embodiment, the lens apparatus satisfies the following conditional expression (3a):

$$1000 < L/\alpha < 40000. \quad (3a)$$

Further, in a case where the above-described insertion detection unit of the driving unit 13 detects insertion of the extender group 5b into the optical axis, the lens apparatus may obtain or acquire the moving amount of the correction lens group 6 based on the temperature detected by the temperature detection unit. The correction lens group 6 is moved when the extender group 5b is inserted but the correction lens group 6 is not thereafter moved with respect to the temperature change even if the extender group has been inserted. This is advantageous in the power consumption for correction of the focus movement.

Further, in the case where the extender group 5b is inserted, the lens apparatus may update the moving amount of the correction lens group 6 for correction of the focus movement caused by the temperature change and insertion of the extender group, based on the temperature detected by the temperature detection unit. Since detection of the temperature inside the lens apparatus and movement of the correction lens group 6 are repeated, it is possible to more accurately correct the focus movement caused by the temperature change.

Further, in the case where the state of the insertion of the extender group is changed to a state of non-insertion of the extender group into the optical axis, the lens apparatus may return the position of the correction lens group 6 to a position before the extender group is inserted (i.e. the controller may control the position of the correction lens group to the position of the correction lens group in a state before the insertion of the extender group). This makes it possible to return the focus to the focus before the extender group is inserted when the state is switched.

In the lens apparatus, the storage unit 17 may include information relating to the moving amount of the correction lens group 6 for correction of the focus movement caused by at least one of factors described below. The factors include at least one of change in the position of the focusing lens group 1, change in the position of the zoom lens group 2, change in the aperture of the aperture stop 3, and change in the attitude of (optical axis of) the lens apparatus with respect to the horizontal plane.

As described above, the present exemplary embodiment makes it possible to provide the lens apparatus that is advantageous to correction of the focus movement caused by, for example, the temperature change and insertion of the extender group.

FIG. 1 described above illustrates the configuration example of the lens apparatus according to the first exemplary embodiment. In the lens apparatus according to the present exemplary embodiment, the storage unit 17 previously stores the information relating to the moving amount of the correction lens group 6 for correction of the focus movement caused by the temperature change and insertion of the extender group. Accordingly, the processing unit 16 obtains or acquires the moving amount of the correction lens group 6 based on the temperature detected by the temperature detection unit 14 and the information stored in the storage unit 17, and causes the driving unit 12 to move the correction lens group 6 along the optical axis based on the acquired moving amount. The focus movement is corrected in the above-described manner. The information for correction of the focus movement stored in the storage unit 17 may be information in a table format or information on an expression including variables relating to the factors of the focus movement.

Figure 2:
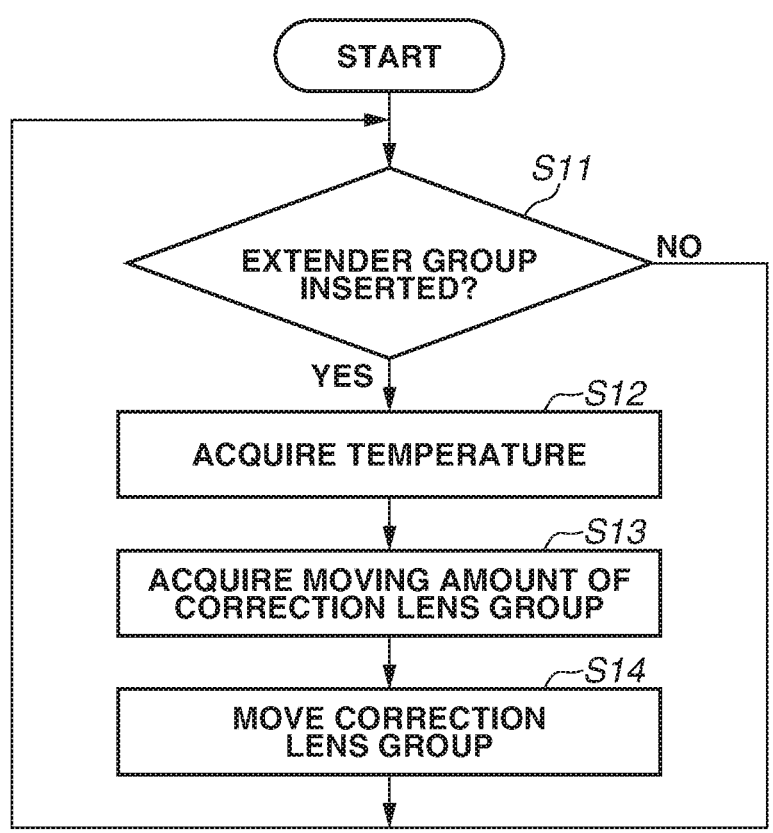
FIG. 2 is a diagram illustrating flow of processing according to the first exemplary embodiment.

FIG. 2 is a diagram illustrating flow of the processing according to the first exemplary embodiment. The processing may be executed by the processing unit 16 based on a computer-readable program. In FIG. 2, in step S11, it is determined whether the extender group 5b has been inserted into the optical axis based on the output of the insertion detection unit of the driving unit 13. In a case where it is determined that the extender group 5b has been inserted (YES in step S11), the processing proceeds to step S12. In a case where it is not determined in such a manner (NO in step S11), the processing in step S11 is repeated. In step S12, the information on the temperature inside the lens apparatus is acquired based on the output of the temperature detection unit 14. In subsequent step S13, the moving amount of the correction lens group 6 is acquired based on the information on the temperature acquired in step S12 and the above-described information stored in the storage unit 17. In step S14, the correction lens group 6 is moved by the driving unit 12 based on the moving amount acquired in step S13. The focus movement caused by the temperature change and insertion of the extender group can be corrected by the above-described processing.

Figure 3:
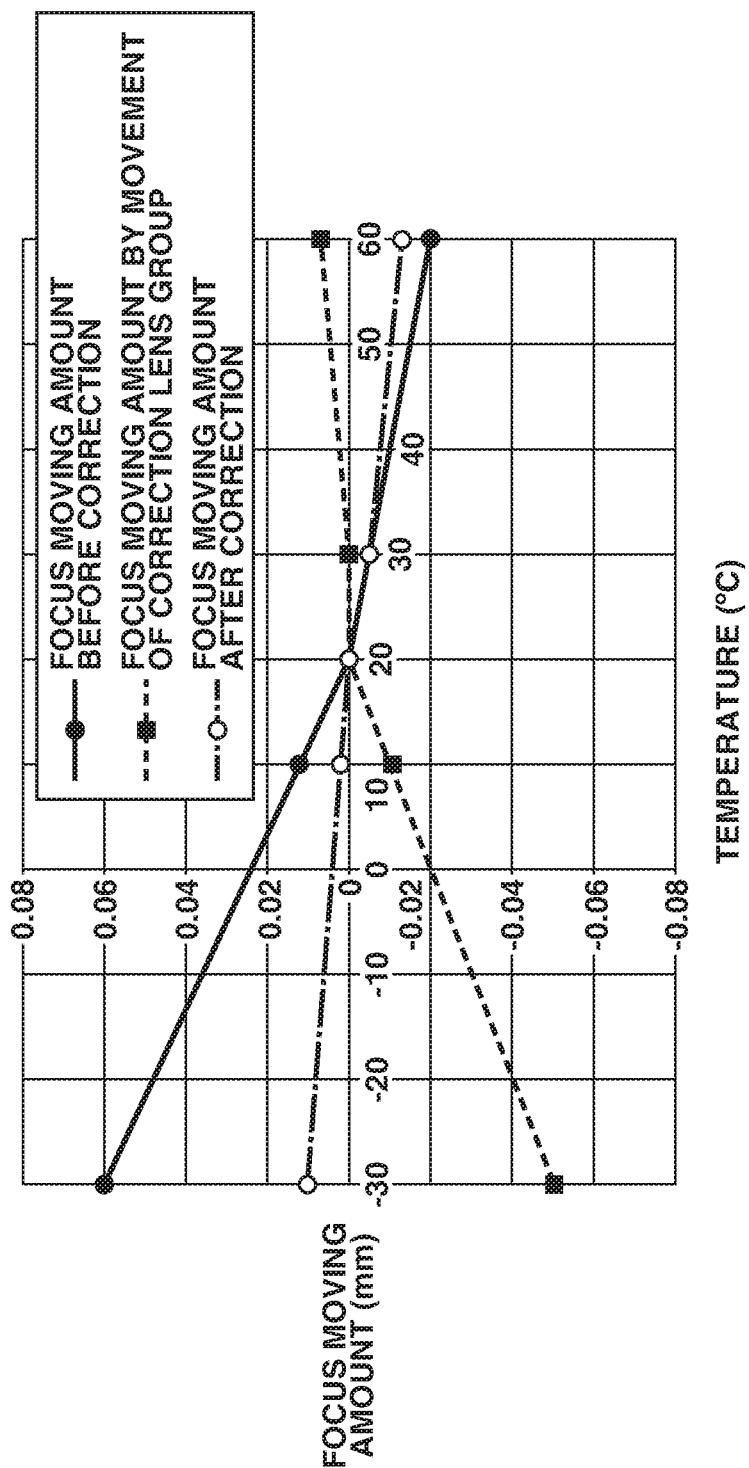
FIG. 3 is a diagram illustrating relationship of a focus moving amount caused by temperature change and insertion of an extender group, a focus moving amount by movement of a correction lens group, and a focus moving amount after correction.

FIG. 3 is a diagram illustrating relationship of the focus moving amount caused by the temperature change and insertion of the extender group (solid line), the focus moving amount by movement of the correction lens group(dashed line), and the focus moving amount after the correction (alternate long and short dash line), according to the first exemplary embodiment. The focus moving amount by movement of the correction lens group is also referred to as focus correction amount. In a graph of FIG. 3, a vertical axis indicates the focus moving amount (mm), and a lateral axis indicates the temperature (° C.) inside the lens apparatus. The focus moving amount is an amount under the condition that the temperature is the room temperature (e.g., +20° C.), the aperture of the aperture stop is a full-aperture state, the object distance is infinite, and the focal distance at the wide-angle end is used as reference (zero). Further, the focus moving amount by movement of the correction lens group is an amount obtained by multiplication of the moving amount of the correction lens group by a back-focus changing amount per unit amount of the moving amount (unit moving amount). In the present exemplary embodiment, the back-focus changing amount per unit moving amount of 1 mm is 1 mm. In the present exemplary embodiment, only the focus movement in the case where the state is switched from the standard state to the extender-group inserted state is corrected. In the present exemplary embodiment, the distance L between the lens surface on the most object side and the lens surface on the most image side of the lens apparatus is 600 mm. Further, F-number is F/1.7 in the standard state and is F/3.4 in the extender-group inserted state, a diameter of permissible circle of confusion is 5 μm, and the depth of focus in the extender-group inserted state is ±17 μm. Table 1 illustrates numerical values relating to the above-described conditional expressions according to the present exemplary embodiment. The lens apparatus according to the present exemplary embodiment satisfies the conditional expressions. As a result of correction of the focus movement caused by the temperature change and insertion of the extender group, the focus moving amount after the correction falls within the range of the depth of focus in the extender-group inserted state (see FIG. 3).

Figure 4:
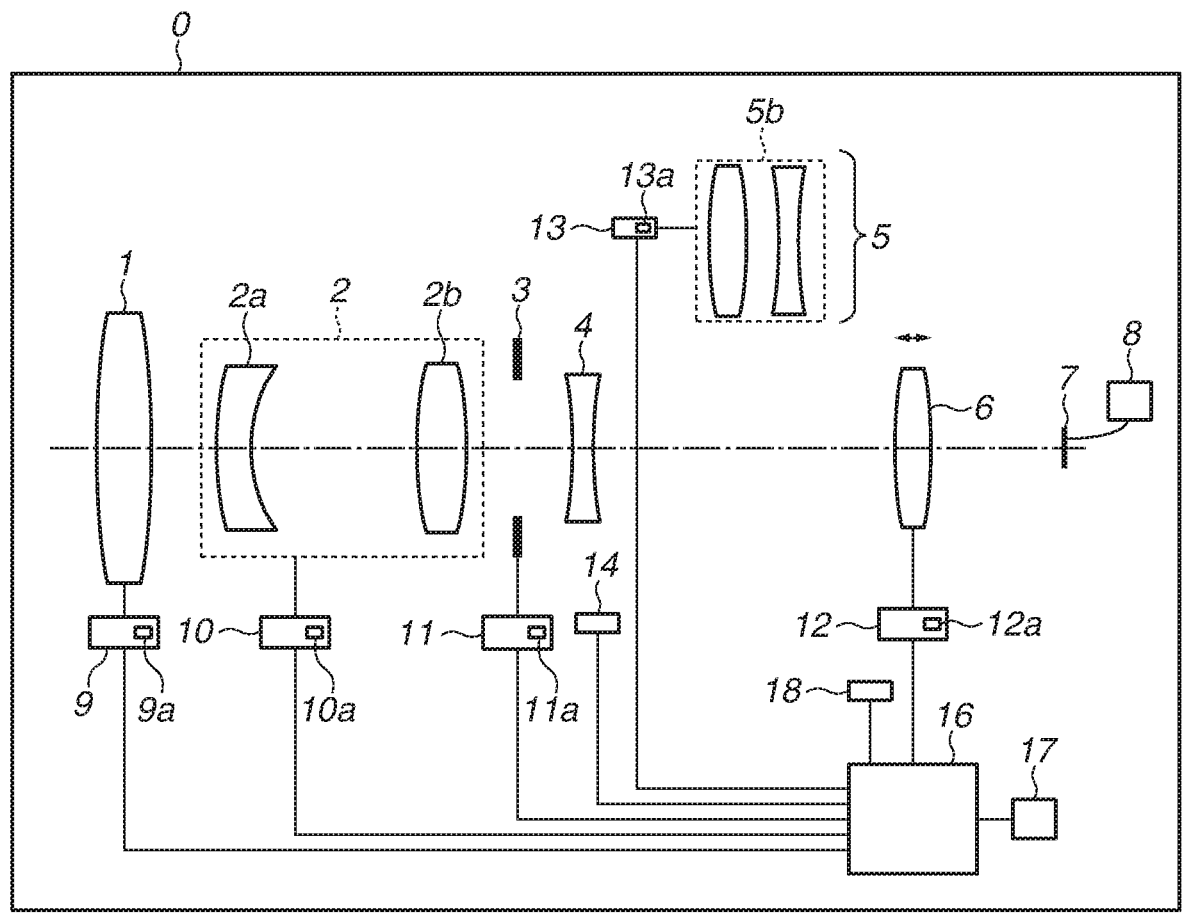
FIG. 4 is a diagram illustrating a configuration example of a lens apparatus according to a second exemplary embodiment.

FIG. 4 is a diagram illustrating a configuration example of a lens apparatus according to a second exemplary embodiment. The configuration of the lens apparatus according to the second exemplary embodiment is different from the configuration of the lens apparatus according to the first exemplary embodiment in that the lens unit 5 does not include the standard group 5*a*. In other words, the lens unit 5 does not include the lens group disposed on the optical axis in the standard state.

Figure 5:
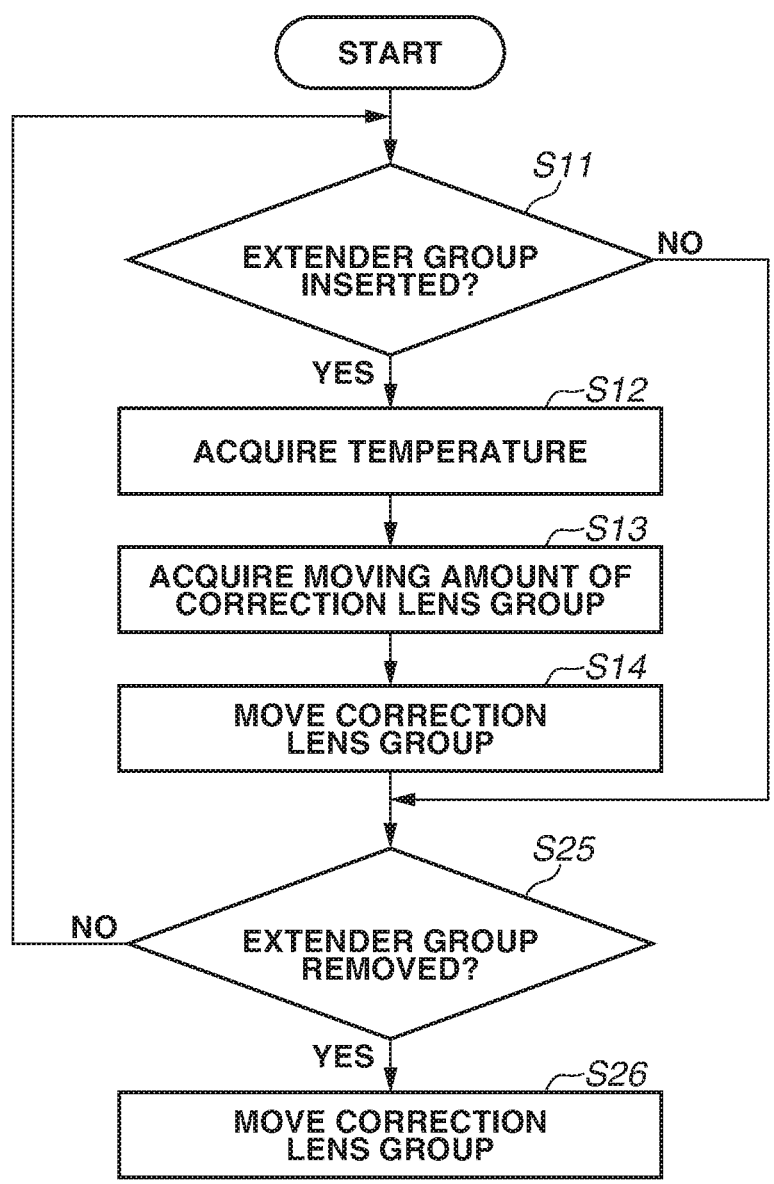
FIG. 5 is a diagram illustrating flow of processing according to the second exemplary embodiment.

FIG. 5 is a diagram illustrating flow of processing according to the second exemplary embodiment. The processing may be executed by the processing unit 16 based on a computer-readable program. The description of processing in steps S11 to S14 in FIG. 5 is omitted because the processing is similar to the processing in FIG. 2. In subsequent step S25, it is determined that the extender group 5*b* has been removed from the optical axis, based on the output of the insertion detection unit in the driving unit 13. In a case where it is determined that the extender group 5*b* has been removed (YES in step S25), the processing proceeds to step S26. In a case where it is not determined in such a manner (NO in step S25), the processing returns to step S11. In step S26, the correction lens group 6 is moved to the position of the correction lens group 6 occupied before insertion of the extender group 5*b*.

Figure 6:
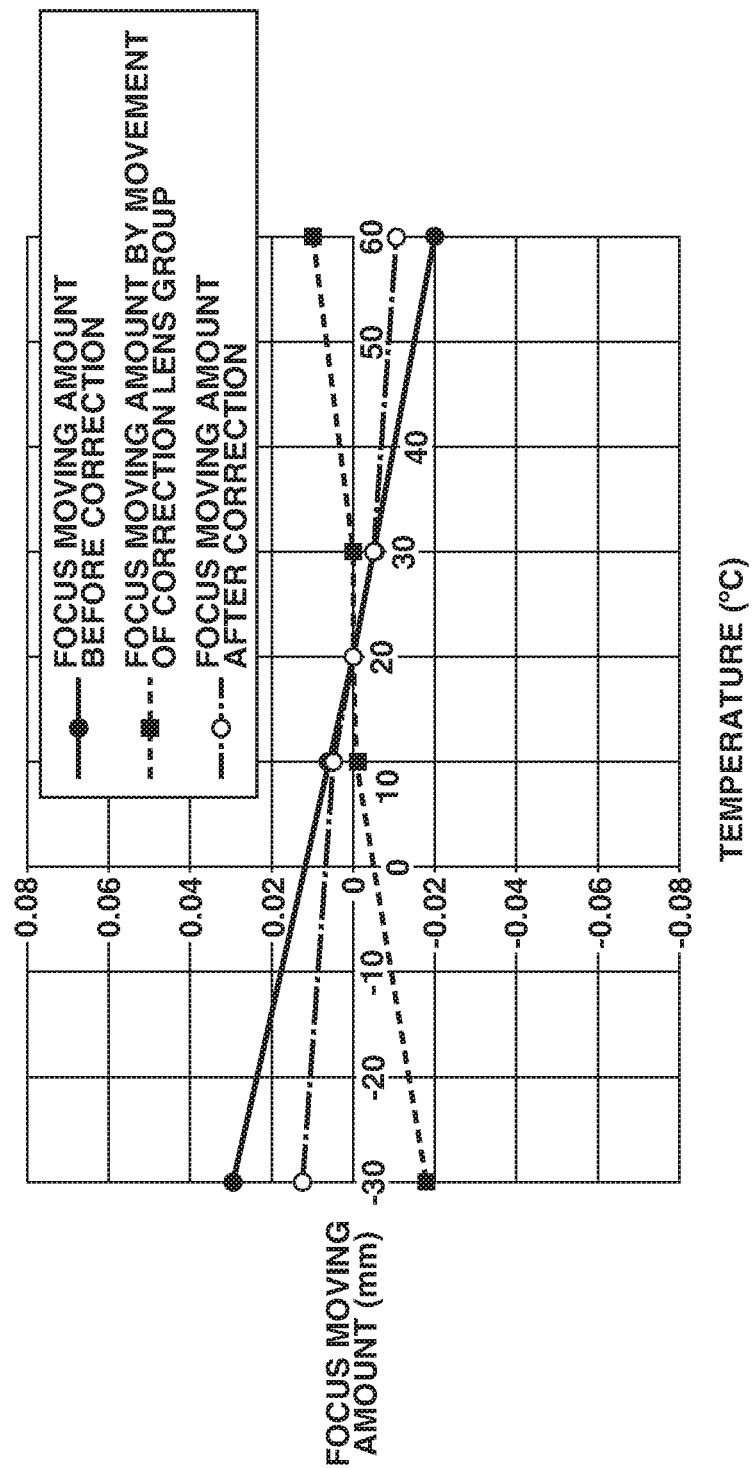
FIG. 6 is a diagram illustrating relationship of a focus moving amount caused by temperature change and insertion of an extender group, a focus moving amount by movement of a correction lens group, and a focus moving amount after correction.

FIG. 6 is a diagram illustrating relationship of the focus moving amount caused by the temperature change and insertion of the extender group (solid line), the focus moving amount by movement of the correction lens group (dashed line), and the focus moving amount after the correction (alternate long and short dash line), according to the second exemplary embodiment. In a graph of FIG. 6, a vertical axis indicates the focus moving amount (mm), and a lateral axis indicates the temperature (° C.) inside the lens apparatus. The focus moving amount is an amount under the condition that the temperature is the room temperature (e.g., +20° C.), the aperture of the aperture stop is a full state, the object distance is infinite, and the focal distance at the wide-angle end is used as reference (zero). Further, the focus moving amount of movement of the correction lens group is an amount obtained by multiplication of the moving amount of the correction lens group by a back-focus changing amount per unit of the moving amount (unit moving amount). In the present exemplary embodiment, the back-focus changing amount per unit moving amount of 1 mm is 1 mm. In the present exemplary embodiment, only the focus movement in the case where the state is switched from the standard state to the extender-group inserted state is corrected. In the present exemplary embodiment, the distance L between the lens surface on the most object side and the lens surface on the most image side of the lens apparatus is 250 mm. Further, F-number is F/1.8 in the standard state and is F/3.6 in the extender-group inserted state, a diameter of permissible circle of confusion is 5 μm, and the depth of focus in the extender-group inserted state is ±18 μm. Table 1 illustrates numerical values relating to the above-described conditional expressions according to the present exemplary embodiment. The lens apparatus according to the present exemplary embodiment satisfies the conditional expressions. As a result of the correction of the focus movement caused by the temperature change and insertion of the extender group, the focus moving amount after the correction falls within the range of the depth of focus in the extender-group inserted state (see FIG. 6).

A configuration example of a lens apparatus according to a third exemplary embodiment is similar to the configuration example (FIG. 1) of the lens apparatus according to the first exemplary embodiment. The lens apparatus according to the third exemplary embodiment, however, is different from the lens apparatus according to the first exemplary embodiment in the following two points (A1 and A2).

(A1) The storage unit 17 includes information relating to the moving amount of the correction lens group 6 for correction of the focus movement caused by the temperature change in the standard state.

(A1) The storage unit 17 includes information relating to the moving amount of the correction lens group 6 for correction of the focus movement caused by the following factors in addition to the focus movement caused by the temperature change. The factors include at least one of change in the position of the focusing lens group 1, change in the position of the zoom lens group 2, change in the aperture of the aperture stop 3, and change in the attitude of (optical axis of) the lens apparatus with respect to the horizontal plane.

In the lens apparatus according to the present exemplary embodiment, the storage unit 17 includes information relating to the moving amount of the correction lens group 6 for correction of the focus movement caused by at least one of the following factors. The factors include change in the position of the focusing lens group 1, change in the position of the zoom lens group 2, change in the aperture of the aperture stop 3, and change in the attitude of (optical axis of) the lens apparatus with respect to the horizontal plane. Accordingly, the processing unit 16 acquires the moving amount of the correction lens group 6 based on the values (detection values) detected by the respective detection units and the information stored in the storage unit 17. The detection units include the temperature detection unit 14 and at least one of the insertion detection unit 13a, the detection unit 9a, the detection unit 10a, the detection unit 11a, and the attitude detection unit 18. Further, the correction lens group 6 is moved along the optical axis by the driving unit 12 based on the moving amount. The focus movement is corrected in such a manner The information for correction of the focus movement stored in the storage unit 17 may be information in a table format or information on an expression (function) including variables relating to the factors of the focus movement.

Figure 7:
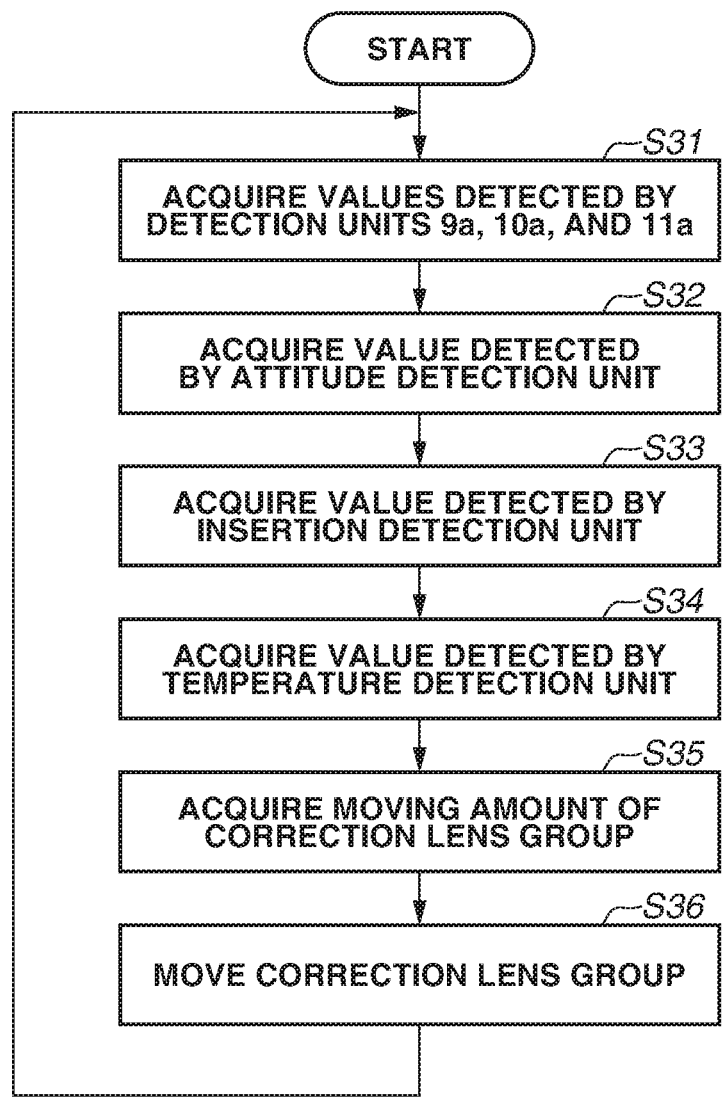
FIG. 7 is a diagram illustrating flow of processing according to a third exemplary embodiment.

FIG. 7 is a diagram illustrating flow of the processing according to the third exemplary embodiment. The processing may be executed by the processing unit 16 based on a computer-readable program. In FIG. 7, in step S31, the values detected by the detection unit 9a, the detection unit 10a, and the detection unit 11a are acquired. In subsequent step S32, the value detected by the attitude detection unit 18 (attitude of lens apparatus) is acquired. In step S33, the value detected by the insertion detection unit 13a (information relating to whether state is standard state or extender-group inserted state) is acquired. In step S34, the value detected by the temperature detection unit 14 (information on temperature inside lens apparatus) is acquired. In subsequent step S35, the moving amount of the correction lens group 6 is acquired based on the information on the detection values acquired in steps S31 to S34 and the above-described information stored in the storage unit 17. In step S36, the correction lens group 6 is moved by the driving unit 12 based on the moving amount acquired in step S35. The focus movement can be corrected by the above-described processing.

Figure 8:
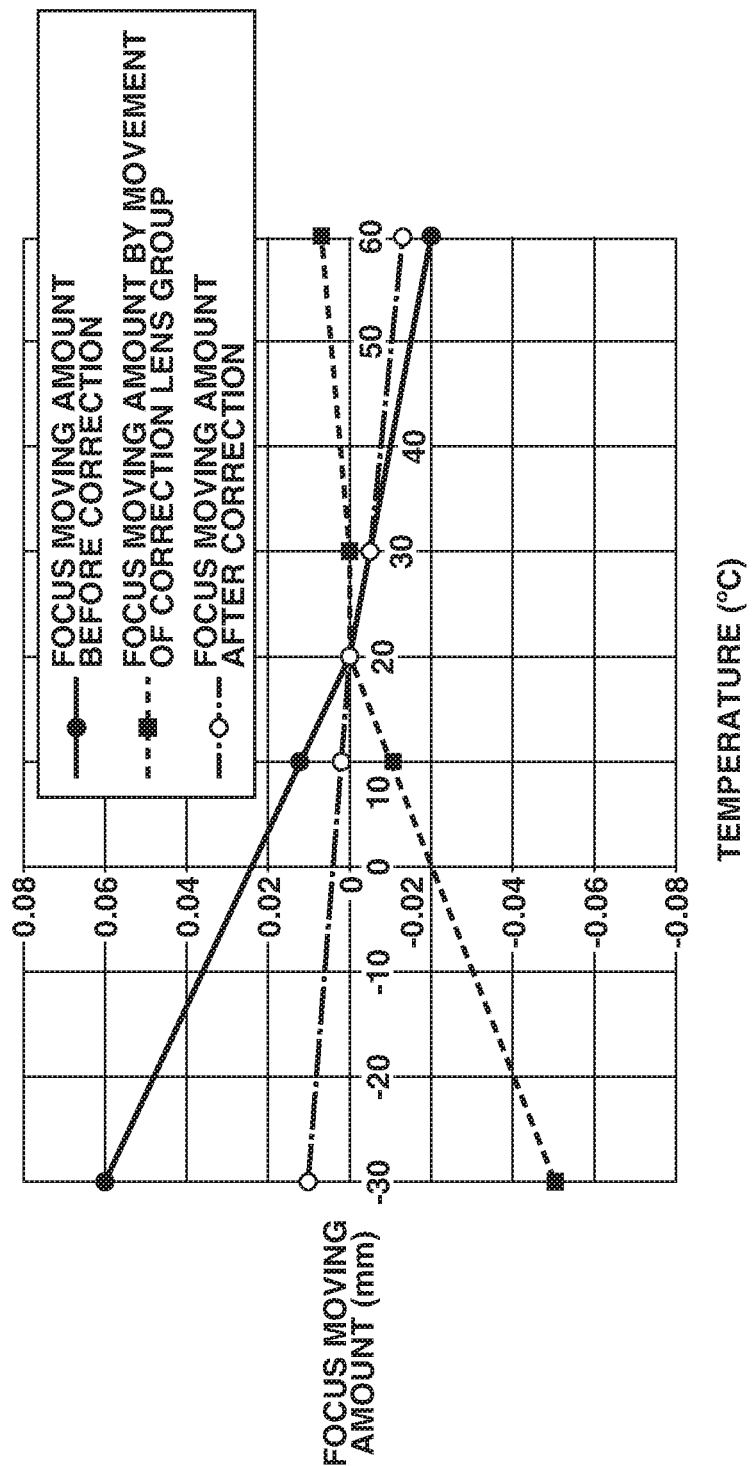
FIG. 8 is a diagram illustrating relationship of a focus moving amount caused by temperature change and insertion of an extender group, a focus moving amount by movement of a correction lens group, and a focus moving amount after correction.

FIG. 8 is a diagram illustrating relationship of the focus moving amount caused by the temperature change and insertion of the extender group (solid line), the focus moving amount by movement of the correction lens group (dashed line), and the focus moving amount after the correction (alternate long and short dash line), according to the third exemplary embodiment. Further, FIG. 9 is a diagram illustrating relationship of the focus moving amount caused by the temperature change (solid line), the focus moving amount by movement of the correction lens group (dashed line), and the focus moving amount after the correction (alternate long and short dash line), in the standard state according to the third exemplary embodiment. In graphs of FIG. 8 and FIG. 9, a vertical axis indicates the focus moving amount (mm), and a lateral axis indicates the temperature (° C.) inside the lens apparatus. The focus moving amount is an amount under the condition that the temperature is the room temperature (e.g., +20° C.), the aperture of the aperture stop is in a full state, the object distance is infinite, and the focal distance at the wide-angle end is used as reference (zero). Further, the focus moving amount by movement of the correction lens group is obtained by multiplication of the moving amount of the correction lens group by a back-focus changing amount per unit of the moving amount (unit moving amount). In the present exemplary embodiment, the back-focus changing amount per unit of 1 mm is 1 mm. In the present exemplary embodiment, the focus movement in the standard state and the focus movement in the case where the state is switched from the standard state to the extender-group inserted state are corrected. In the present exemplary embodiment, the distance L between the lens surface on the most object side and the lens surface on the most image side of the lens apparatus is 600 mm. Further, F-number is F/1.7 in the standard state and is F/3.4 in the extender-group inserted state, a diameter of permissible circle of confusion is 5 μm, the depth of focus in the standard state is ±8.5 μm, and the depth of focus in the extender-group inserted state is ±17 μm. Table 1 illustrates numerical values relating to the above-described conditional expressions according to the present exemplary embodiment. The lens apparatus according to the present exemplary embodiment satisfies the conditional expressions. Further, the lens apparatus according to the present exemplary embodiment is configured to correct the focus movement caused by the temperature change in the standard state and the focus movement caused by the temperature change and insertion of the extender group. As a result, the focus moving amount after the correction falls within the range of the depth of focus in each of the standard state and the extender-group inserted state (see FIG. 8 and FIG. 9).

Although the exemplary embodiments of the disclosure have been described above, the disclosure is not limited to these exemplary embodiments and various modifications and alternations can be made within the scope of the disclosure.

TABLE 1

| | | First Exemplary Embodiment | Second Exemplary Embodiment | Third Exemplary Embodiment |
|---|---|---|---|---|
| Conditional Expression (1) | $\|\beta/\alpha\|$ | 0.200 | 0.028 | 0.200 |
| Conditional Expression (2) | $\|\gamma/x\|$ | 0.000 | 0.000 | 0.300 |
| Conditional Expression (3) | $L/\alpha$ | 12000 | 13889 | 12000 |
| | $\alpha$ | 0.0500 | 0.0180 | 0.0500 |
| | $\beta$ | 0.0100 | 0.0005 | 0.0100 |
| | x | 0.0500 | 0.0180 | 0.0500 |
| | y | 0.0000 | 0.0000 | 0.0150 |
| | L | 600 | 250 | 600 |

The exemplary embodiments of the disclosure make it possible to provide the lens apparatus that is advantageous to correction of the focus movement caused by, for example, the temperature change and insertion of the extender group.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-163194, filed Aug. 31, 2018, which is hereby incorporated by reference herein in its entirety.

What is claimed is:

1. An apparatus that includes, in order from an object side to an image side, a focusing lens group, a zoom lens group, and a relay lens group and includes an aperture stop between the zoom lens group and the relay lens group or within the relay lens group, the relay lens group including an extender group to be selectively inserted into an optical axis and a correction lens group to be moved along the optical axis for correction of focus movement, the apparatus comprising:
 a temperature detector configured to detect temperature in the apparatus;
 a storage storing information relating to a moving amount of the correction lens group; and
 a controller configured to control a position of the correction lens group,
 wherein the storage stores first information relating to the moving amount for correction of focus movement due to change in the temperature and the insertion of the extender group,
 wherein the controller is configured to obtain the moving amount based on the temperature and the first information, and
 wherein a conditional expression $$0 \le |\beta/\alpha| \le 0.5,$$

is satisfied where $\alpha$ is a maximum of absolute values of the moving amount at a wide-angle end in a temperature range of T<10° C. and T>30° C., and $\beta$ is a maximum of absolute values of the moving amount at the wide-angle end in a temperature range of 10° C.≤T≤30° C.

2. The apparatus according to claim 1, wherein the correction lens group is disposed on the image side with respect to the inserted extender group.

3. The apparatus according to claim 1, wherein the focus movement due to change in the temperature is corrected in a case of the insertion of the extender group.

4. The apparatus according to claim 1,
 wherein the storage includes second information relating to the moving amount for correction of the focus movement due to change in the temperature, and
 wherein a conditional expression $$0 \le |y/x| \le 1.0$$

is satisfied where x is a maximum of absolute values of the moving amount in the first information, and y is a maximum of absolute values of the moving amount in the second information.

5. The apparatus according to claim 1, wherein a conditional expression $$500 < L/\alpha < 100000$$

is satisfied where L is a distance between a lens surface nearest to an object and a lens surface nearest to an image.

6. The apparatus according to claim 1, further comprising an insertion detector configured to detect the insertion of the extender group,
 wherein the controller is configured to obtain the moving amount based on the detected temperature in a case where the insertion detector detects the insertion of the extender group.

7. The apparatus according to claim 1, wherein the controller is configured to obtain the moving amount for change in the temperature in a state where the extender group has been inserted into the optical axis, based on the detected temperature after the insertion of the extender group.

8. The apparatus according to claim 1, wherein, in a case where the state of the insertion of the extender group is changed to a state of non-insertion of the extender group into the optical axis, the controller is configured to control the position of the correction lens group to the position of the correction lens group in a state before the insertion of the extender group.

9. The apparatus according to claim 1, wherein the storage stores, in the first information, information relating to the moving amount for correction of focus movement due to at least one of change in a position of the focusing lens group, change in a position of the zoom lens group, change in an aperture of the aperture stop, and change in an attitude of the apparatus.

10. The apparatus according to claim 4, wherein the storage stores, in the second information, information relating to the moving amount for correction of focus movement due to at least one of change in a position of the focusing lens group, change in a position of the zoom lens group, change in an aperture of the aperture stop, and change in an attitude of the apparatus.

11. An image pickup apparatus comprising:
 a lens apparatus; and
 an image pickup element configured to receive an image formed by the lens apparatus,
 wherein the lens apparatus includes, in order from an object side to an image side, a focusing lens group, a zoom lens group, and a relay lens group, and includes an aperture stop between the zoom lens group and the relay lens group or within the relay lens group, the relay lens group including an extender group to be selectively inserted into an optical axis, and a correction lens group to be moved along the optical axis for correction of focus movement, the lens apparatus including:
 a temperature detector configured to detect temperature in the lens apparatus,
 a storage storing information relating to a moving amount of the correction lens group, and
 a controller configured to control a position of the correction lens group,
 wherein the storage stores first information relating to the moving amount for correction of focus movement due to change in the temperature and the insertion of the extender group,
 wherein the controller is configured to obtain the moving amount based on the temperature and the first information, and
 wherein a conditional expression $$0 \le |\beta/\alpha| \le 0.5,$$

is satisfied where $\alpha$ is a maximum of absolute values of the moving amount at a wide-angle end in a temperature range of T<10° C. and T>30° C., and $\beta$ is a maximum of absolute values of the moving amount at the wide-angle end in a temperature range of 10° C.≤T≤30° C.

12. The image pickup apparatus according to claim 11, wherein the correction lens group is disposed on the image side with respect to the inserted extender group.

13. The image pickup apparatus according to claim 11, wherein the focus movement due to change in the temperature is corrected in a case of the insertion of the extender group.

14. The image pickup apparatus according to claim 11,
 wherein the storage includes second information relating to the moving amount for correction of the focus movement due to change in the temperature, and wherein a conditional expression $$0 \leq |y/x| \leq 1.0$$

is satisfied where x is a maximum of absolute values of the moving amount in the first information, and y is a maximum of absolute values of the moving amount in the second information.

15. The image pickup apparatus according to claim 11, wherein a conditional expression $$500 < L/\alpha < 100000$$

is satisfied where L is a distance between a lens surface nearest to an object and a lens surface nearest to an image.

16. The image pickup apparatus according to claim 11, further comprising an insertion detector configured to detect the insertion of the extender group,
wherein the controller is configured to obtain the moving amount based on the detected temperature in a case where the insertion detector detects the insertion of the extender group.

17. The image pickup apparatus according to claim 11, wherein the controller is configured to obtain the moving amount for change in the temperature in a state where the extender group has been inserted into the optical axis, based on the detected temperature after the insertion of the extender group.

18. The image pickup apparatus according to claim 11, wherein, in a case where the state of the insertion of the extender group is changed to a state of non-insertion of the extender group into the optical axis, the controller is configured to control the position of the correction lens group to the position of the correction lens group in a state before the insertion of the extender group.

19. The image pickup apparatus according to claim 11, wherein the storage stores, in the first information, information relating to the moving amount for correction of focus movement due to at least one of change in a position of the focusing lens group, change in a position of the zoom lens group, change in an aperture of the aperture stop, and change in an attitude of the apparatus.

20. The image pickup apparatus according to claim 14, wherein the storage stores, in the second information, information relating to the moving amount for correction of focus movement due to at least one of change in a position of the focusing lens group, change in a position of the zoom lens group, change in an aperture of the aperture stop, and change in an attitude of the apparatus.

* * * * *